United States Patent
Paniccia et al.

(10) Patent No.: US 11,435,184 B2
(45) Date of Patent: Sep. 6, 2022

(54) PROCESS FLOW FOR FABRICATING INTEGRATED PHOTONICS OPTICAL GYROSCOPES

(71) Applicant: Anello Photonics, Inc., Santa Clara, CA (US)

(72) Inventors: Mario Paniccia, Santa Clara, CA (US); Avi Feshali, Los Angeles, CA (US)

(73) Assignee: Anello Photonics, Inc., Santa Clara, CA (US)

( * ) Notice: Subject to any disclaimer, the term of this patent is extended or adjusted under 35 U.S.C. 154(b) by 0 days.

(21) Appl. No.: 17/536,749

(22) Filed: Nov. 29, 2021

(65) Prior Publication Data
US 2022/0082384 A1 Mar. 17, 2022

Related U.S. Application Data

(62) Division of application No. 17/249,603, filed on Mar. 5, 2021, now Pat. No. 11,187,532.

(60) Provisional application No. 63/079,928, filed on Sep. 17, 2020, provisional application No. 62/986,379, filed on Mar. 6, 2020.

(51) Int. Cl.
*G01C 19/72* (2006.01)
*G02B 6/126* (2006.01)
*G02B 6/12* (2006.01)

(52) U.S. Cl.
CPC .......... *G01C 19/722* (2013.01); *G02B 6/126* (2013.01); *G02B 2006/12061* (2013.01)

(58) Field of Classification Search
CPC .............................. G01C 19/722; G02B 6/126
USPC ........................................................ 356/460
See application file for complete search history.

(56) References Cited

U.S. PATENT DOCUMENTS

| | | | |
|---|---|---|---|
| 7,106,448 B1 * | 9/2006 | Vawter | G02B 6/12004 385/12 |
| 7,248,771 B2 * | 7/2007 | Schmidt | G01N 21/05 385/129 |
| 10,222,474 B1 * | 3/2019 | Raring | G01S 17/931 |

(Continued)

FOREIGN PATENT DOCUMENTS

CN 109143465 A 1/2019

OTHER PUBLICATIONS

PCT International Search Report and Written Opinion for International Application No. PCT/US2021/21403 dated Jun. 11, 2021, 16 pages.

*Primary Examiner* — Kaveh C Kianni
(74) *Attorney, Agent, or Firm* — Lowenstein Sandler LLP; Madhumita Datta

(57) ABSTRACT

Aspects of the present disclosure are directed to configurations of compact ultra-low loss integrated photonics-based waveguides for optical gyroscope applications, and the methods of fabricating those waveguides for ease of large scale manufacturing. Four main process flows are described: (1) process flow based on a repeated sequence of oxide deposition and anneal; (2) chemical-mechanical polishing (CMP)-based process flow followed by wafer bonding; (3) Damascene process flow followed by oxide deposition and anneal, or wafer bonding; and (4) CMP-based process flows followed by oxide deposition. Any combination of these process flows may be adopted to meet the end goal of fabricating optical gyroscope waveguides in one or more layers on a silicon substrate using standard silicon fabrication technologies.

11 Claims, 15 Drawing Sheets

(56) References Cited

U.S. PATENT DOCUMENTS

| | | | |
|---|---|---|---|
| 10,458,795 B1* | 10/2019 | Grine | G01C 19/662 |
| 10,718,491 B1* | 7/2020 | Raring | H01S 5/0225 |
| 2004/0114900 A1 | 6/2004 | Pan et al. | |
| 2005/0180713 A1 | 8/2005 | Heideman et al. | |
| 2008/0000551 A1 | 1/2008 | Sato et al. | |
| 2009/0154872 A1* | 6/2009 | Sherrer | G02B 6/4248 |
| | | | 385/14 |
| 2010/0015741 A1* | 1/2010 | Krug | G02F 1/065 |
| | | | 438/31 |
| 2013/0279845 A1* | 10/2013 | Kobrinsky | G02B 6/4244 |
| | | | 438/31 |
| 2014/0023320 A1 | 1/2014 | Lee et al. | |
| 2015/0008788 A1* | 1/2015 | El-Gamal | B81B 3/0021 |
| | | | 336/200 |
| 2015/0279855 A1* | 10/2015 | Lu | H01L 27/11582 |
| | | | 438/269 |
| 2018/0081206 A1* | 3/2018 | Puckett | G02B 6/132 |
| 2019/0097722 A1* | 3/2019 | McLaurin | G02B 19/0057 |
| 2020/0386944 A1 | 12/2020 | Paniccia et al. | |
| 2021/0194206 A1* | 6/2021 | Raring | G02B 27/095 |

\* cited by examiner

| Pregrown Oxide | Silicon Nitride | Silicon Oxide |
|---|---|---|
|  |  |  |

| Pregrown Oxide | Silicon Nitride | Silicon Oxide |
|---|---|---|
|  |  |  |

PROCESS FLOW FOR FABRICATING INTEGRATED PHOTONICS OPTICAL GYROSCOPES

RELATED APPLICATION

This application is a divisional of and claims the benefit of U.S. patent application Ser. No. 17/249,603, filed Mar. 5, 2021, titled "Process Flow For Fabricating Integrated Photonics Optical Gyroscopes," which claims the benefit of U.S. Provisional Patent Application No. 63/079,928, filed Sep. 17, 2020, entitled, "Chemical Mechanical Polishing Process Flow For Integrated Photonics Optical Gyroscopes," and U.S. Provisional Patent Application No. 62/986,379, filed Mar. 6, 2020, entitled, "Process Flow For Fabricating Integrated Photonics Optical Gyroscopes," the entireties of which are incorporated by reference herein.

TECHNICAL FIELD

The present disclosure relates to various fabrication processes of integrated photonics-based optical gyroscopes, including the fabrication processes, some of which involve chemical mechanical polishing (CMP).

BACKGROUND

Gyroscopes (also referred to in short as "gyros") are devices that can sense angular velocity. The applications of gyroscopes include, but are not limited to, military, aircraft navigation, robotics, autonomous vehicles, virtual reality, augmented reality, gaming etc. Gyroscopes can be mechanical or optical, and can vary in precision, performance, cost and size. Since optical gyroscopes do not have any moving parts, they have advantages over mechanical gyroscopes as they can withstand effects of shock, vibration and temperature variation better than the mechanical gyroscopes with moving parts. The most common optical gyroscope is the fiber optical gyroscope (FOG) that operates based on interferometric measurements of optical phase shift due to the Sagnac effect (a phenomenon encountered in interferometry that is elicited by rotation). Construction of a FOG typically involves a coil comprising several turns of polarization-maintaining (PM) fiber. Laser light is launched into both ends of the PM fiber coil so that two optical beams travel in opposite directions. If the fiber coil is moving, the optical beams traveling in opposite directions experience different optical path lengths with respect to each other. By setting up an interferometric system, one can measure the small path length difference that is proportional to the area of the loop enclosed by the turns of the fiber coil and the angular velocity of the rotating fiber coil. This path length difference is expressed as a phase signal.

Phase signal of an optical gyro is proportional to the Sagnac effect times the angular rotation velocity, as shown in the following equation:

$$\Delta\phi = (8\pi NA/\lambda c)\Omega$$

where, N=number of turns in the gyro,
A=area enclosed
$\Omega$=angular rotation velocity
$\Delta\phi$=optical phase difference signal
$\lambda$=wavelength of light
c=speed of light Fiber-based gyroscopes can provide very high precision, but at the same time, they are of larger footprint, are very expensive, and are hard to assemble due to the devices being built based on discrete optical components that need to be aligned precisely. Often, manual alignment is involved, which is hard to scale up for volume production.

Present inventors propose replacing fibers with waveguide based integrated photonics components for cost-effective easy integration on a semiconductor platform which is much more promising for volume production of gyroscopes. This application describes various process flows for fabricating silicon nitride (SiN) waveguide cores in a silicon fab using repeated deposition and anneal steps, and/or chemical mechanical polishing (CMP) techniques, as elaborated below.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
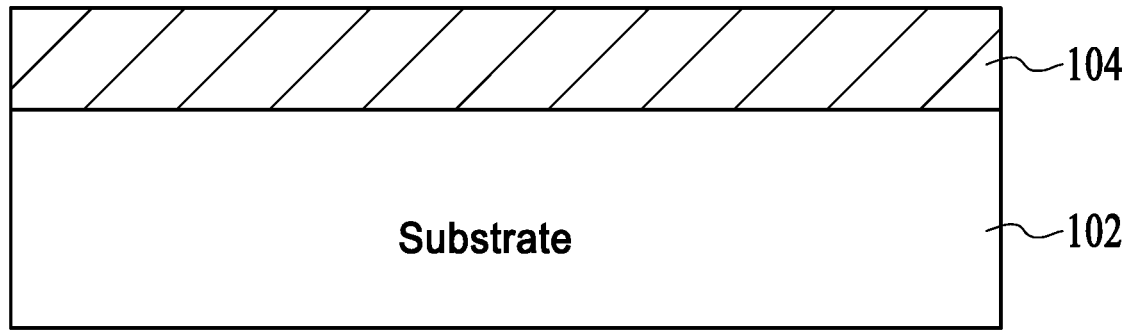
FIG. 1 is a schematic of a substrate with a pre-grown oxide layer with ultra-low hydrogen absorption peak at a wavelength of choice, according to an embodiment of the present disclosure.
Figure 1:

Aspects of the present disclosure are directed to configurations of compact ultra-low loss integrated photonics-based waveguides for optical gyroscope applications, and the methods of fabricating those waveguides for ease of large scale manufacturing. Four main process flows are described: (1) process flow based on a repeated sequence of oxide deposition and anneal; (2) chemical-mechanical polishing (CMP)-based process flow followed by wafer bonding; (3) Damascene process flow followed by oxide deposition and anneal, or wafer bonding; and (4) CMP-based process flows followed by oxide deposition. Any combination of these process flows may be adopted to meet the end goal of fabricating optical gyroscope waveguides in one or more layers on a silicon substrate using standard silicon fabrication technologies. In this particular application, the CMP-based process flows achieve at least two objectives: obtaining accurate thickness of a layer without having to precisely control the deposition parameters, and, obtaining a desired surface roughness of the CMP-ed top surface of a SiN core, as the surface roughness has a big impact on waveguide loss. Note that CMP can be used even before depositing the SiN layer to further reduce roughness of the deposited SiN layer.

The key to fiber-based optical gyroscopes' high performance is the long length of high quality, low loss, optical fiber that is used to measure the Sagnac effect. The present inventors recognize that with the advent of integrated silicon photonics suitable for wafer scale processing, there is an opportunity to replace FOGs with smaller integrated photonic chip solutions without sacrificing performance. Photonics based optical gyros have reduced size, weight, power and cost, but in addition can be mass produced in high volume, are immune to vibration and have the potential to offer performances equivalent to FOGs.

One key element of this integrated photonic solution is to produce very low loss waveguides that can be manufactured using wafer scale processes and can be used to replace the long length PM optical fiber in optical gyros. The technology platform used for this integrated photonics based optical gyros is based on silicon nitride ($Si_3N_4$) waveguide core surrounded by oxide or fused silica claddings. The whole waveguide structure is sometimes referred to as SiN waveguide for simplicity.

Disclosed herein are configurations and methods to produce very low loss SiN waveguides that can be used as integral component for a small-footprint integrated optical gyroscope, which is abbreviated as SiPhOG™ (Silicon Photonics Optical Gyroscope). The propagation loss in the SiN waveguides fabricated according to the process flows described herein can be well below 0.1 db/meter. This is a vast improvement over the current state-of-the-art SiN process with propagation loss in the range of 0.1 db/centimeter. The key to lowering the loss while using the standard silicon fab processes and equipment is to either use high quality fused silica (sometimes called "glass") wafers, or, using wafers with a pre-grown oxide as a lower cladding and then depositing a silicon oxide layer of the required thickness as the upper cladding by repeated deposition/anneal steps. The repeated deposition/anneal steps ensure precise control of thickness of the upper cladding layer, as well as expunging trapped hydrogen from the deposited layers.

The present inventors recognize that distributing the SiN waveguide coils (or spirals) and/or rings into different vertically separated layers (e.g., two or more layers) leads to lower values of gyro sensitivity without increasing the form factor. Details of a stacked multi-layer gyro configuration are covered in co-owned provisional application 62/858,599 filed on Jun. 7, 2019, titled, "Integrated Silicon Photonics Optical Gyroscope on Fused Silica Platform." A follow-up provisional application 62/896,365 filed on Sep. 5, 2019, titled "Single-layer and Multi-layer Structures for Integrated Silicon Photonics Optical Gyroscopes" describes additional embodiments. The applications are incorporated herein by reference. In addition, system-level integration of a silicon photonics based front-end chip and a SiN waveguide chip have been covered in co-owned provisional applications 62/872,640 filed Jul. 10, 2019, titled "System Architecture for Silicon Photonics Optical Gyroscopes", and 62/904,443 filed Sep. 23, 2019, titled, "System Architecture for Silicon Photonics Optical Gyroscopes with Mode-Selective Waveguides." The applications are incorporated herein by reference.

FIGS. 1-8 illustrate an example process flow for fabricating SiN waveguide cores (one layer or two layers) on a conventional silicon substrate with asymmetric upper cladding (Tetra Ethyl Ortho Silicate (TEOS)) and lower cladding (grown oxide) around the SiN waveguide cores. Specifically, FIG. 1 shows a wafer with a substrate 102 with a pre-grown oxide layer 104. The substrate 102 may be a silicon substrate and the pre-grown oxide layer may be a crystalline layer with an example dimension of 10-15 μm. The key characteristics of the layer 104 is that it has low absorption peak at the wavelengths of interest (e.g., around 1550 nm, but not necessarily at exact 1550 nm, as the waveguide propagation loss may be optimized for a wavelength slightly different from 1550 nm.) The wafer may be polished on both sides.

Figure 2:
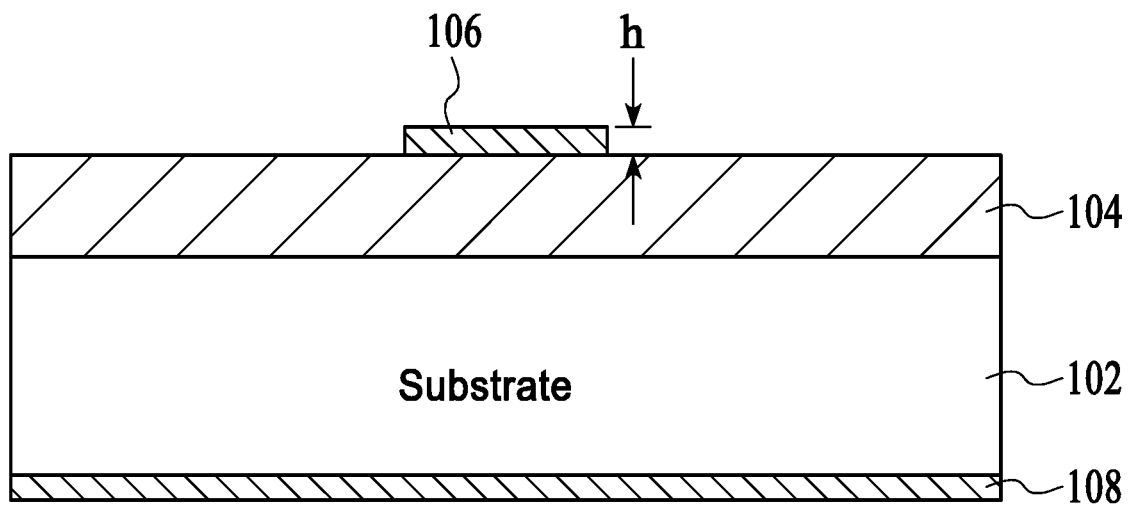
FIG. 2 is schematic of a silicon nitride (SiN) waveguide core patterned on the pre-grown oxide acting as a lower cladding, according to an embodiment of the present disclosure.
Figure 2:
Figure 2:
Figure 3:
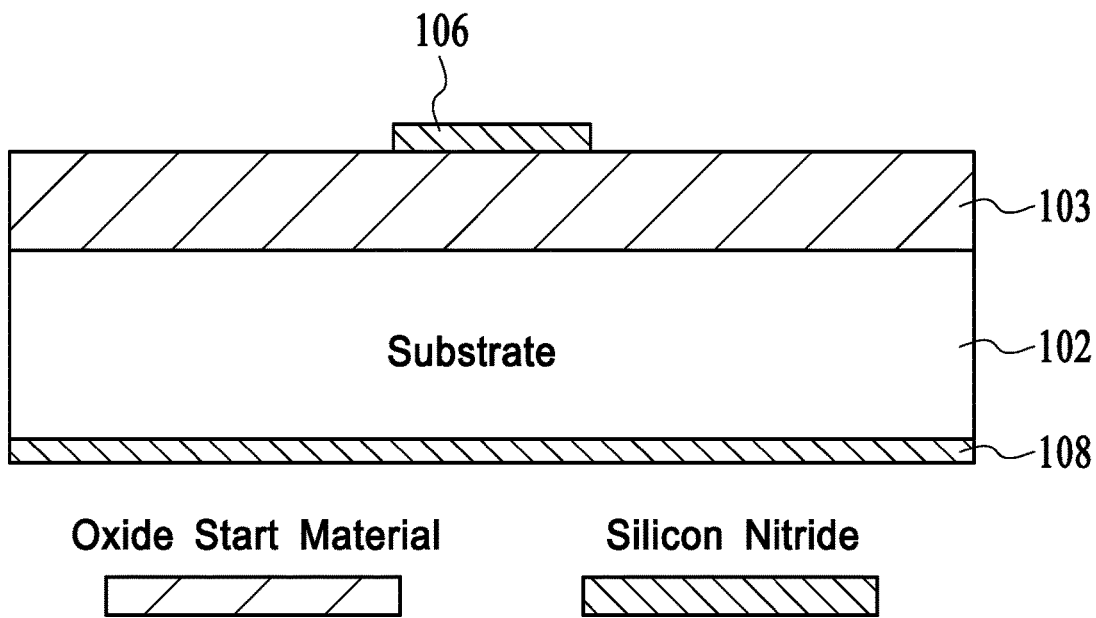
FIG. 3 is a schematic of a SiN waveguide core patterned on a different type of oxide layer as the starting material acting as the lower cladding, according to an embodiment of the present disclosure.

FIG. 2 shows that a SiN layer is deposited to form a layer on top of and adjacent to the pre-grown oxide layer 104, which is patterned to create waveguide core 106. A non-limiting illustrative dimension of the SiN waveguide core 106 is a height (i.e. thickness 'h' of the waveguide layer) of 60-100 nm and a lateral width of 2-10 µm. Persons skilled in the art would appreciate that these illustrative dimensional values mentioned in the specification are not limiting to the scope of the disclosure. The SiN layer may be deposited using Low Pressure Chemical Vapor Deposition (LPCVD) process or other processes. The bottom SiN layer 108 may remain intact, where the top SiN layer is photolithographically or otherwise patterned on the pre-grown oxide layer 104 to form waveguide core 106. In order to reduce line edge roughness in the SiN waveguide core 106, some post-etch treatment may be needed. For example, a blanket Argon (Ar) sputter step after photoresist and lithography assist layers (e.g., BARC) may be removed to smooth the top and sides of the SiN waveguide core 106. Alternatively, a blanket dip in hot phosphoric acid may be performed, which has very high selectivity between SiN (high etch rate) and the pre-grown oxide 104. Post-etch clean may include a Piranha clean (e.g., hot sulfuric acid mixed with peroxide) and SC1 (diluted hot ammonium hydroxide and peroxide mix) or SC2 (hydrochloric acid mixed with peroxide). Finally, a post-etch high temperature anneal may be performed to drive any remaining hydrogen or other impurities from the SiN layer. FIG. 3 shows that in an alternative embodiment, instead of a crystalline pre-grown oxide layer 104, other types of oxide start material 103 can be used too as the bottom cladding, an example of which is non-crystalline fused silica ("glass") or quartz.

Figure 4:
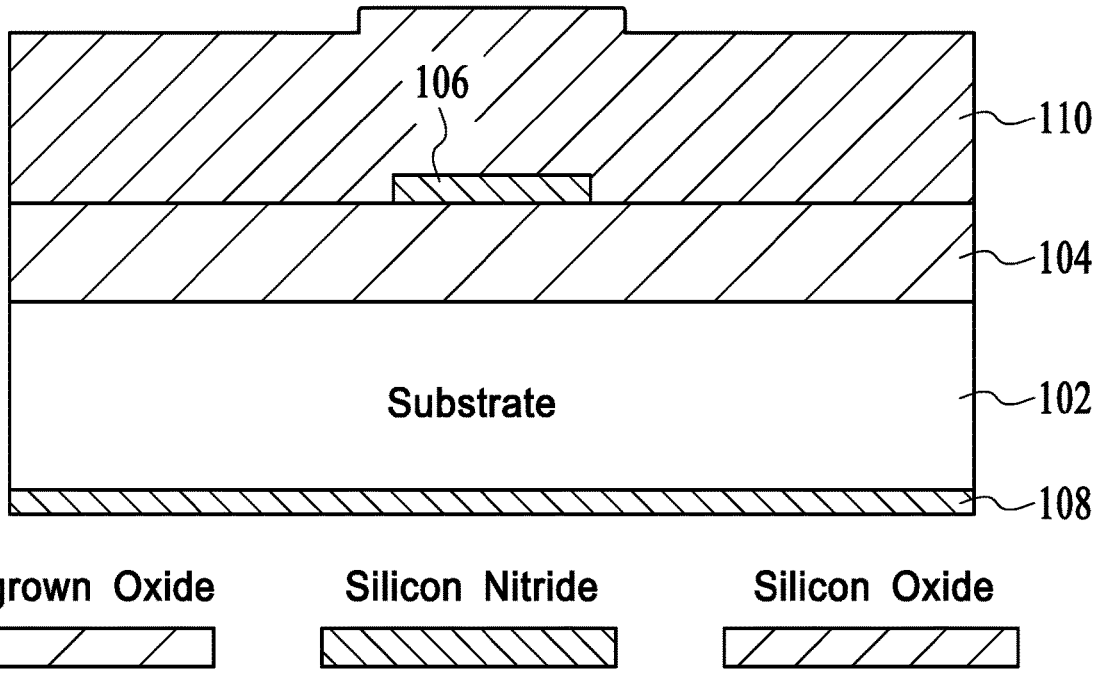
FIG. 4 is a schematic of a SiN waveguide core with a silicon oxide top cladding, according to an embodiment of the present disclosure.

Continuing with the process flow with the pre-grown oxide layer 104, as shown in FIG. 4, a silicon oxide layer (also called TEOS layer) 110 is grown to cover the SiN waveguide core 106. The silicon oxide layer 110 may have a total thickness of 2-3 µm. The hydrogen in the TEOS layer needs to be minimized, and the growth rate is adjusted accordingly. Optionally, a pre-deposition anneal may be performed (e.g., at 1150-1200° C. for 2 or more hours). Total final thickness of the TEOS layer may be obtained in several rounds, e.g. each round producing a layer that is 0.1 to 0.2 µm thick. Note that the structure shown in FIG. 4 has asymmetric cladding around the waveguide core 106, as the upper cladding is TEOS (layer 110), and the lower cladding is grown oxide (layer 104). The waveguide loss depends largely on the quality of the TEOS layer acting as the upper cladding.

Figure 5:
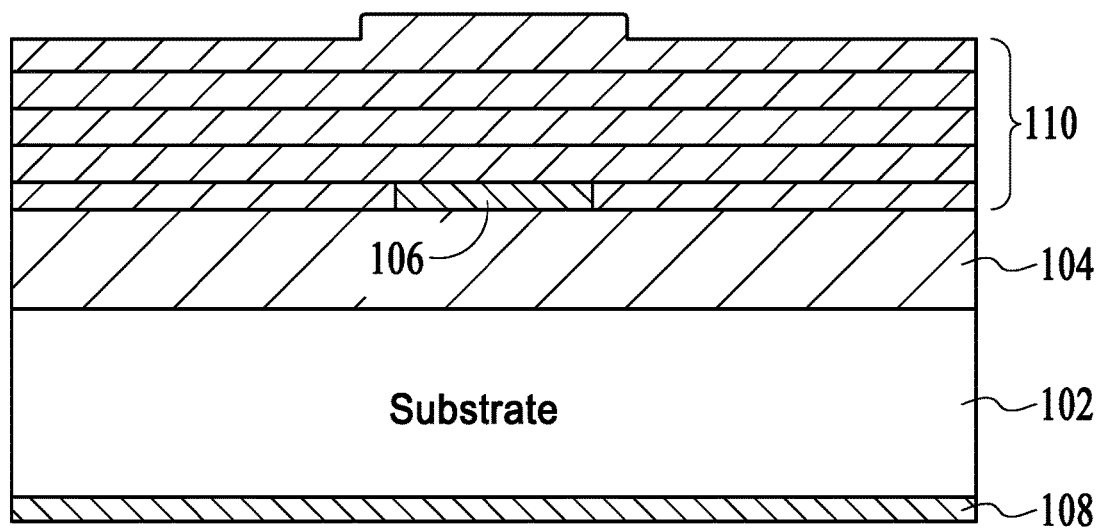
FIG. 5 is a schematic showing individual layers of the silicon oxide top cladding, according to an embodiment of the present disclosure.

As shown in FIG. 5, the oxide layer 110 comprises individual layers of deposited TEOS, each deposition followed by an anneal step to drive hydrogen away. Though only 5 layers are shown in the figure, any arbitrary number of layers may be chosen depending on the deposition rate and anneal time. For example, if a total thickness of layer 110 is 2 µm, then ten layers may be deposited, each having 0.2 µm thickness. Typically a high-temperature LPCVD method is used for TEOS deposition. The method may start with a pre-deposition anneal. Then deposition-anneal-deposition-anneal sequence is repeated multiple times. For each anneal, the temperature may be 1150-1200° C. and the duration may be 2 hours. Note that instead of TEOS as the precursor gas, chlorinated sources or deuterated sources may be used for silicon oxide deposition.

Figure 6:
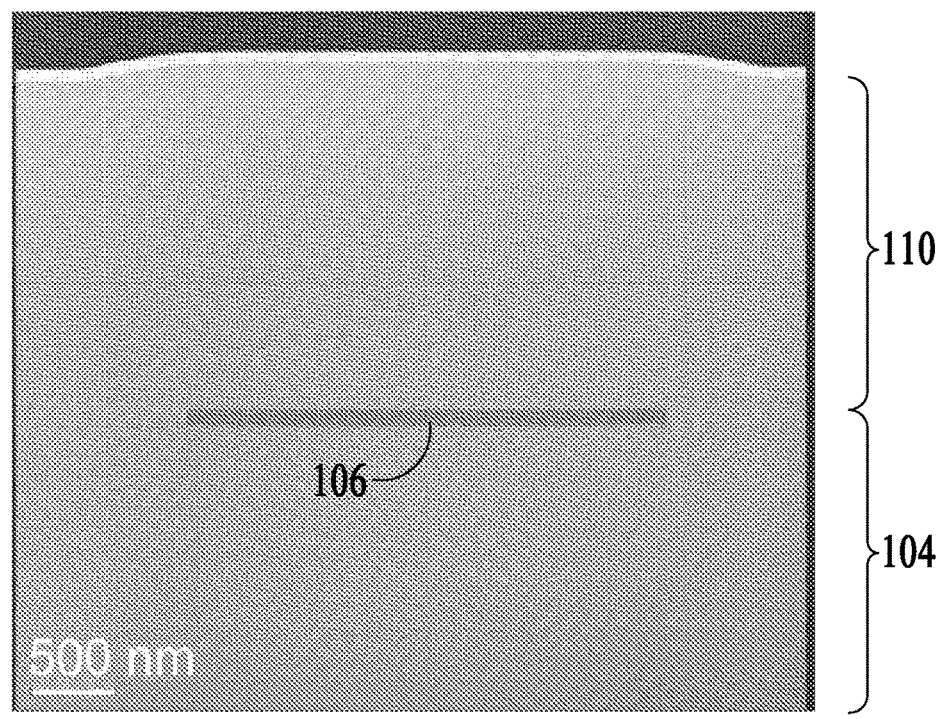
FIG. 6 is a transmission electron micrograph (TEM) of a cross section of a SiN waveguide core with its top and bottom claddings, as fabricated according to an example process of the present disclosure.

FIG. 6 is a transmission electron micrograph (TEM) of a cross section of a SiN waveguide core with its top and bottom claddings, as fabricated according to an example process of the present disclosure. This TEM demonstrates that the deposited upper cladding oxide layer 110 has properties as good as the lower cladding pre-grown oxide layer 104.

Figure 7:
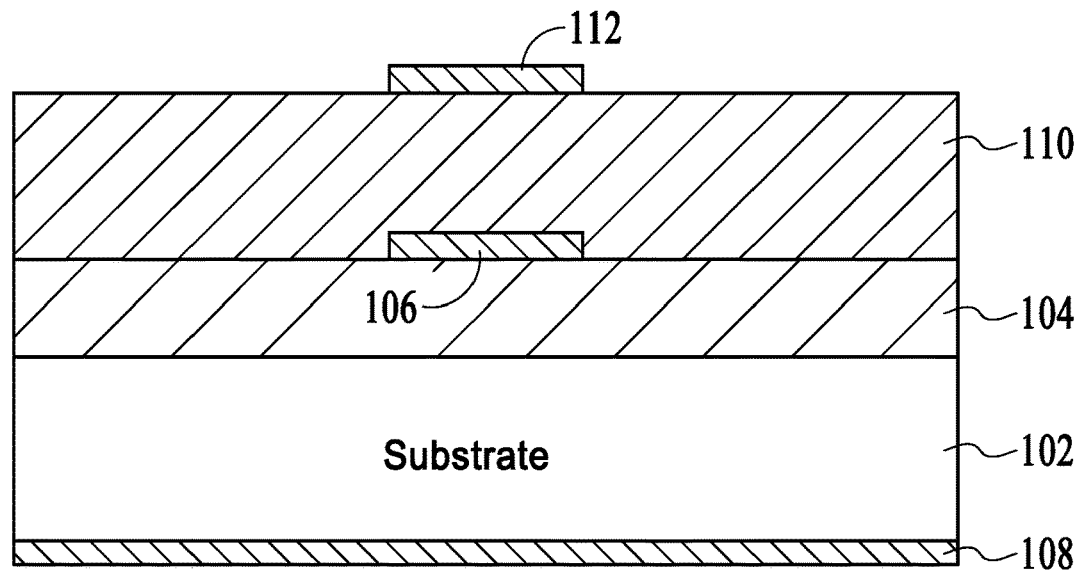
FIG. 7 is a schematic of a second SiN waveguide core patterned at a vertical distance away from the previously formed SiN waveguide core, according to an embodiment of the present disclosure.
Figure 7:
Figure 7:
Figure 7:
Figure 8:
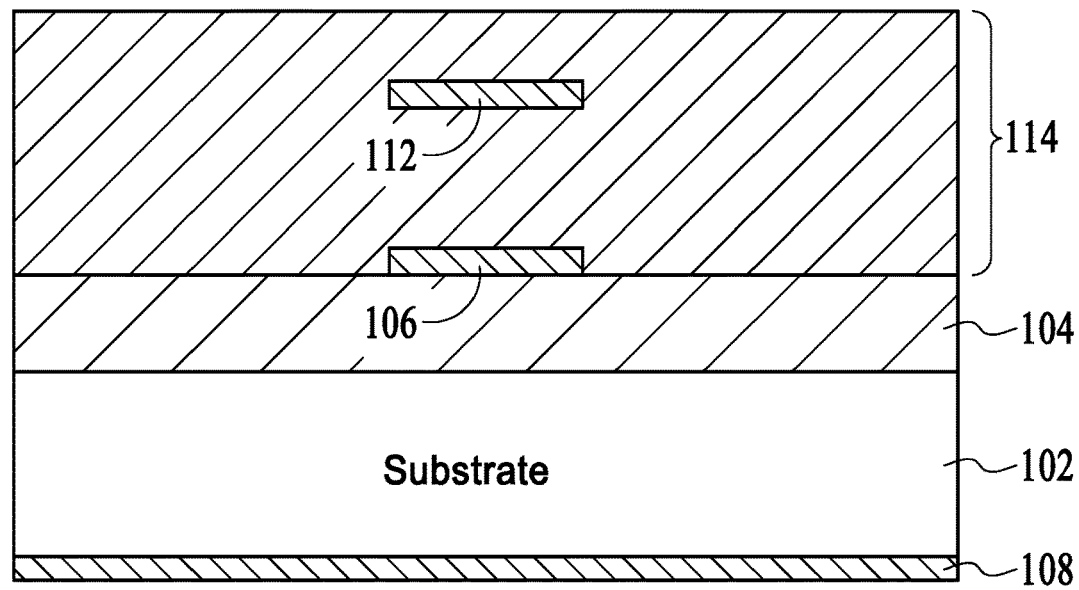
FIG. 8 is a schematic of two vertically separated SiN waveguide cores with a silicon oxide top and bottom cladding for the top layer of SiN waveguide core, and silicon oxide top cladding and pre-grown oxide bottom cladding for the bottom layer of SiN waveguide core, according to an embodiment of the present disclosure.
Figure 8:
Figure 8:
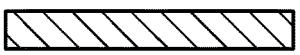
Figure 8:

FIGS. 7 and 8 show formation of another waveguide core 112 to implement a multi-layer optical gyroscope. Note that though for illustrative purposes only two waveguide core layers are shown, it is possible to create more than two waveguide core layers by the process flows discussed herein. Specifically, FIG. 7 shows that the deposited silicon oxide layer 110 is polished and then the top SiN waveguide core 112 is patterned on top of layer 110 using the same process used to form the bottom SiN waveguide core 106 discussed above. FIG. 8 shows that the deposition-anneal-deposition-anneal sequence is repeated to bury the top SiN waveguide core 112 below an upper cladding. In other words, oxide layer 110 in FIG. 7 is extended above waveguide core 112 to create the total thickness of the oxide layer 114 in FIG. 8. The final anneal step may be longer (e.g., 6 hours to prevent hydrogen diffusion downwards.

Figure 9:
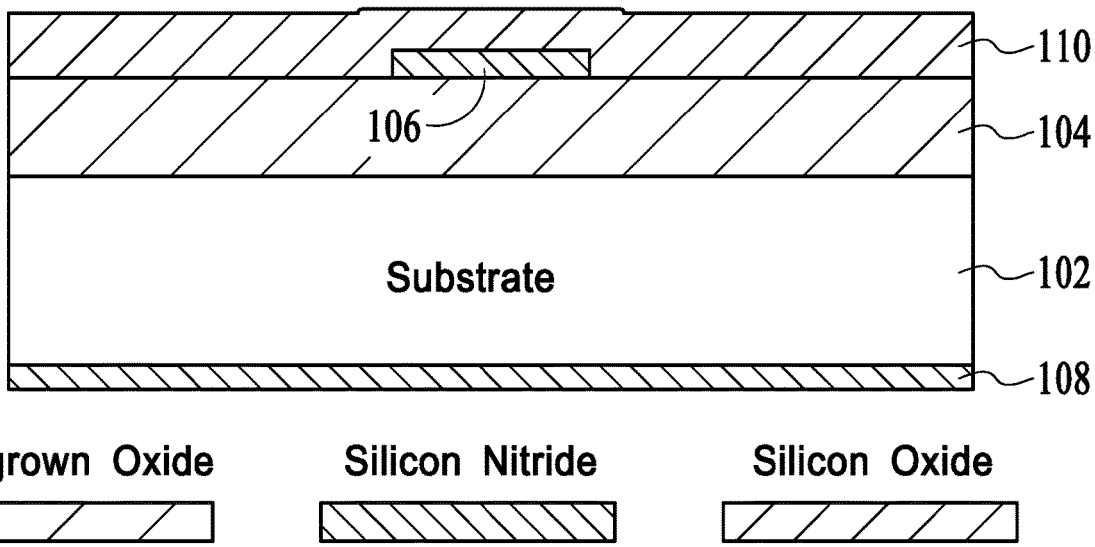
FIG. 9 is a first schematic of chemical mechanical polishing (CMP) of silicon oxide layer for a subsequent wafer bonding process, according to an embodiment of the present disclosure.
Figure 10:
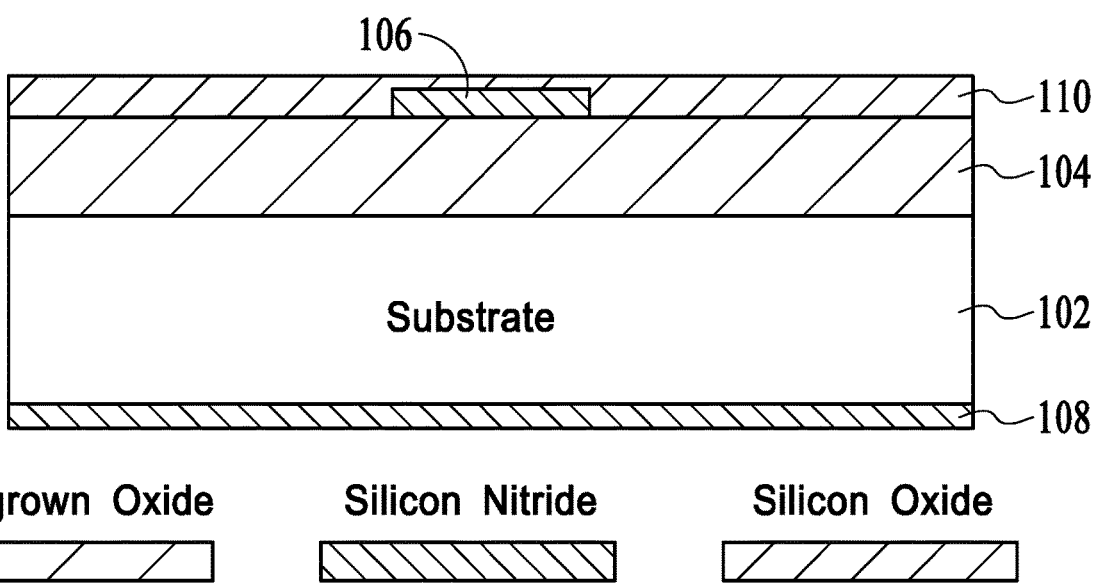
FIG. 10 is a second schematic of chemical mechanical polishing (CMP) of silicon oxide layer for a subsequent wafer bonding process, according to an embodiment of the present disclosure.
Figure 11:
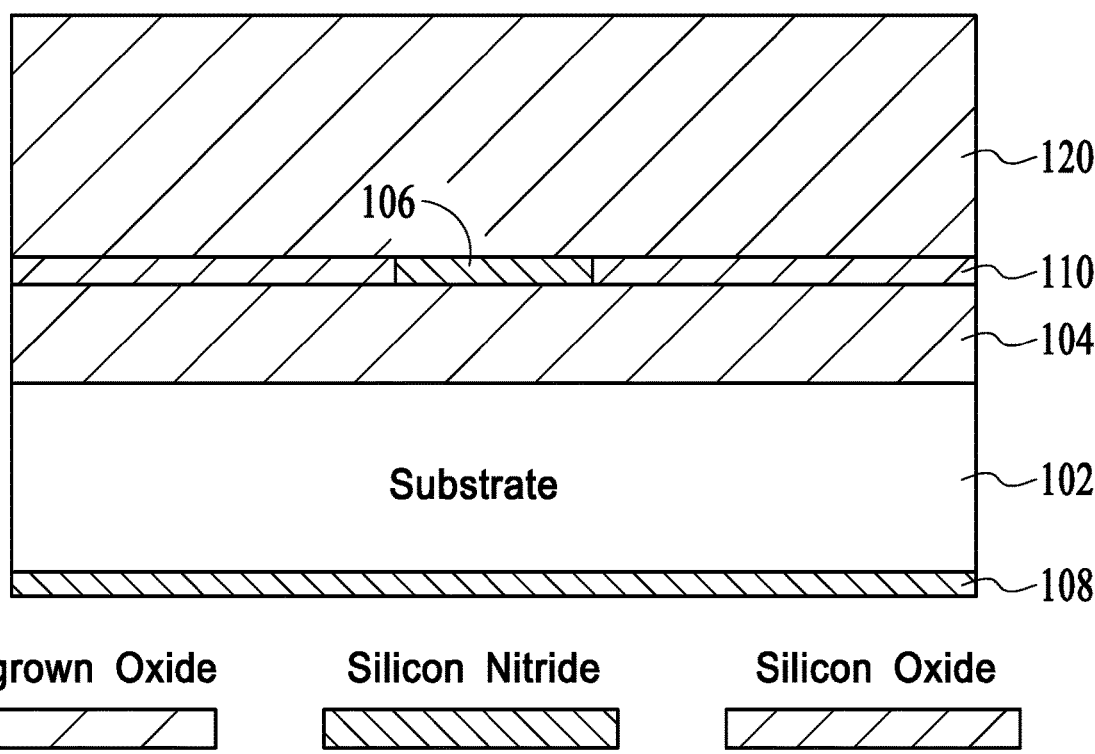
FIG. 11 is a schematic of a wafer bonded on top of the SiN waveguide core in the CMP=based process flow, according to an embodiment of the present disclosure.

FIGS. 9-11 illustrate an alternative process flow involving chemical mechanical polishing (CMP) and wafer bonding to create the upper cladding. Specifically, FIG. 9 shows formation of the silicon oxide layer 110 above the SiN waveguide core 106 as described above. The process may include a pre-deposition cleaning step with sulfuric acid and SC1 or SC2. Additionally, a pre-deposition anneal step may be performed. By using high temperature LPCVD, the possibility of air gap at the SiN-oxide interface is minimized. FIG. 10 shows the initial thickness of the oxide layer 110 is reduced by CMP to be almost flush with the SiN waveguide core 106 or extending slightly above the SiN waveguide core 106. Dummy structures can be added to ensure CMP uniformity and process control. FIG. 11 shows a fused silica wafer 120 may be bonded on top of the CMP-thinned oxide layer 110, where the wafer 120 acts as the upper cladding.

Figure 12:
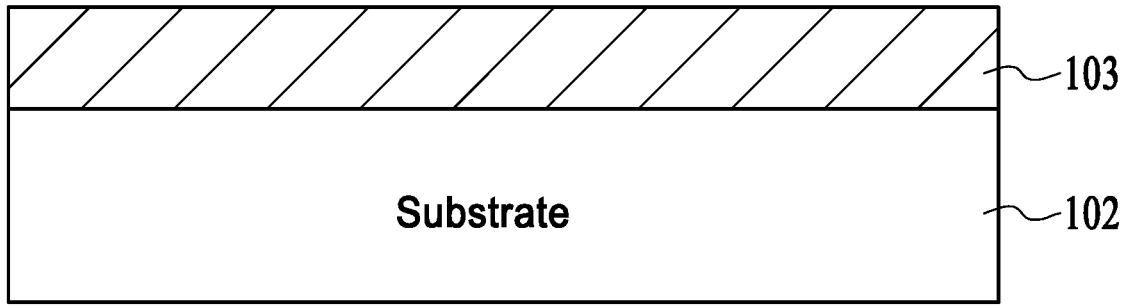
FIG. 12 is a schematic of a starting material for a Damascene process flow, according to an embodiment of the present disclosure.
Figure 12:
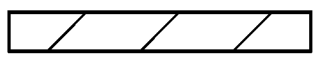
Figure 13:
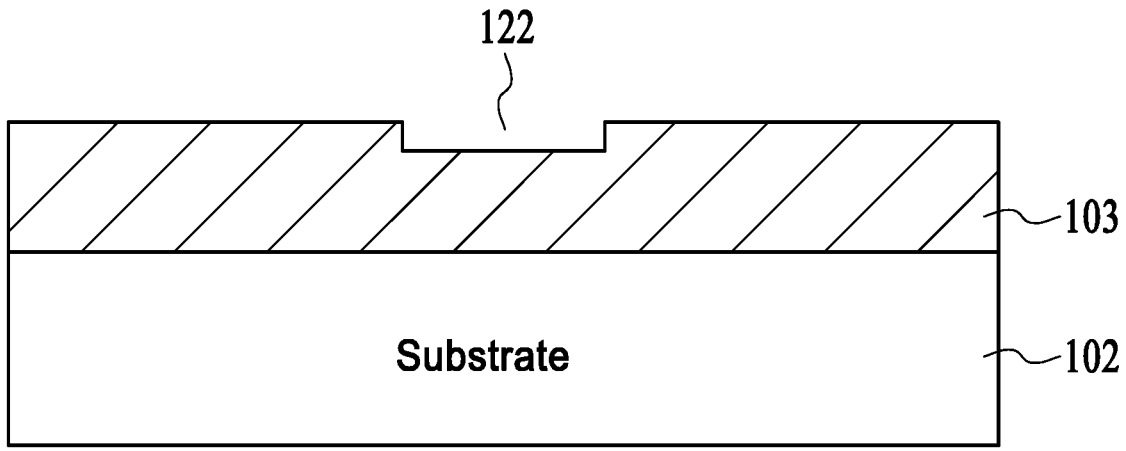
FIG. 13 is a schematic of a trench etched for the SiN waveguide core in the Damascene process flow, according to an embodiment of the present disclosure.
Figure 13:
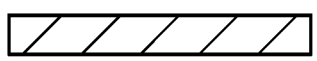

FIGS. 12-16 illustrate yet another alternative process flow involving the Damascene process. As shown in FIG. 12, in the Damascene process, the oxide start material 103 may be a pre-grown oxide (such as 104 described in FIG. 1). FIG. 13 shows that a trench (or notch) 122 is created in the oxide start material 103 by timed etch. The dimension of the trench 122 is the same as the dimension of the SiN waveguide core 106 (e.g., desired waveguide core height 97.5 nm can be an example depth of the trench 122, and the lateral width of the trench matches the waveguide width (e.g., 2.5-4.5 um)). The sidewalls of the trench 122 should have vertical sidewalls, as controlled by the timed etch parameters.

Figure 14:
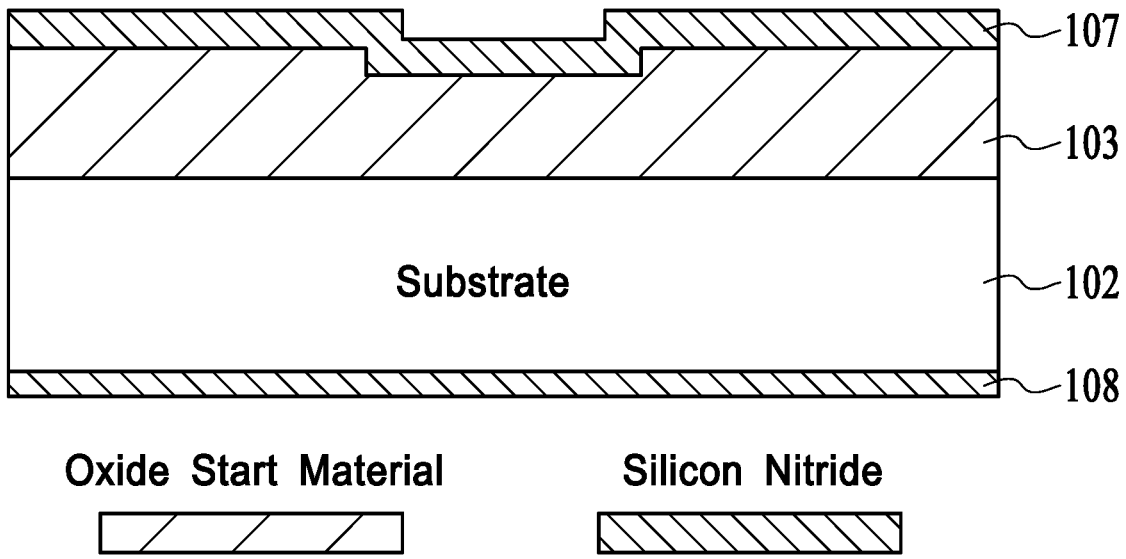
FIG. 14 is a schematic of trench filled with SiN to form the SiN waveguide core in the Damascene process flow, according to an embodiment of the present disclosure.
Figure 15:
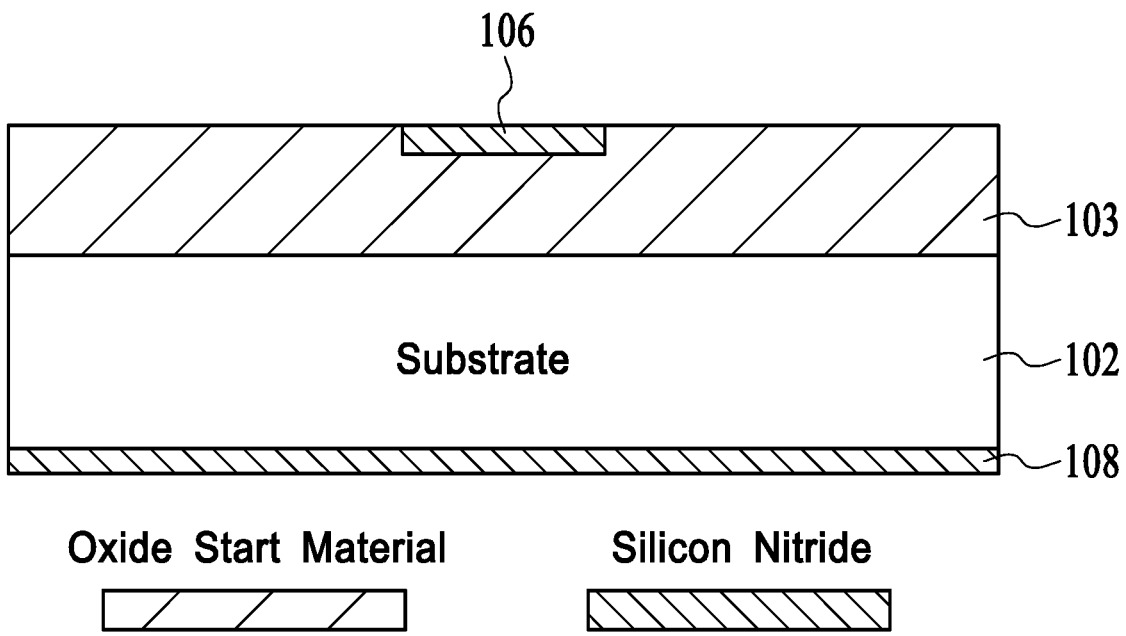
FIG. 15 is a schematic of the SiN waveguide core polished down to a plane in the Damascene process flow, according to an embodiment of the present disclosure.

FIG. 14 shows that a silicon nitride layer 107 is deposited on top of the oxide start material 103 conforming to the notch 122. At the same time SiN layer 108 is also formed on the back side of the substrate. At least the top SiN layer 107 needs to be as contaminant-free as possible. LPCVD method of SiN deposition is preferred. Also, annealing is performed to drive contaminants (including hydrogen) out of the SiN layer 107. FIG. 15 shows that the SiN layer 107 is polished down to the oxide layer 103 so that the remaining SiN in the trench 122 creates the SiN waveguide core 106. After polishing, a cleaning step is performed, followed by anneal (e.g., at 1150-1200 C for 2-6 hours).

Figure 16:
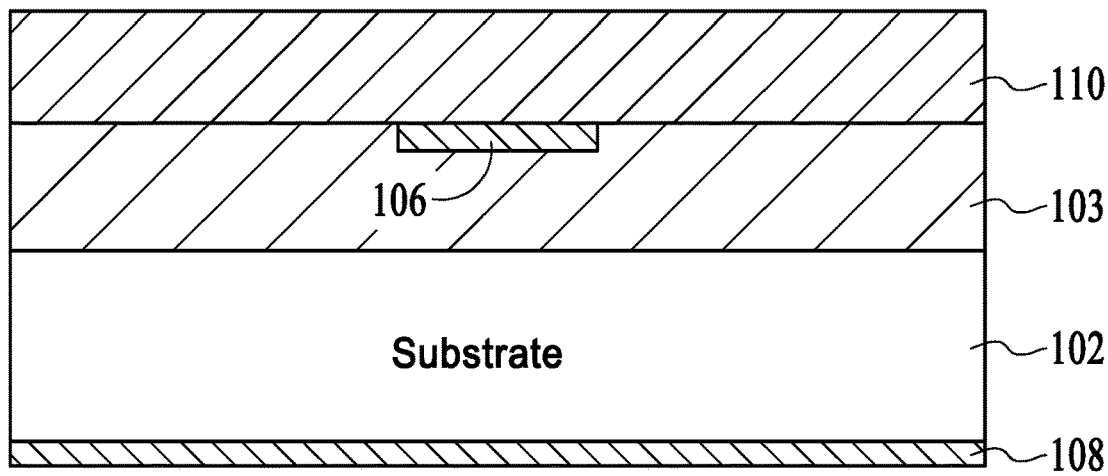
FIG. 16 is a schematic of a silicon oxide layer deposited on top of the SiN waveguide core in the Damascene process flow, according to an embodiment of the present disclosure.

FIG. 16 shows formation of an upper cladding, which may comprise a deposited silicon oxide layer 110 as described above. TEOS oxide layer 110 may be formed by repeated sequence of deposition and anneal to reach a desired thickness of 2-3 um. The anneal length can vary and collective length of anneal may be up to 20 hours to drive out contaminants.

Note that wafer bonding as described above may be used to create the upper cladding in a Damascene process.

Figure 17:
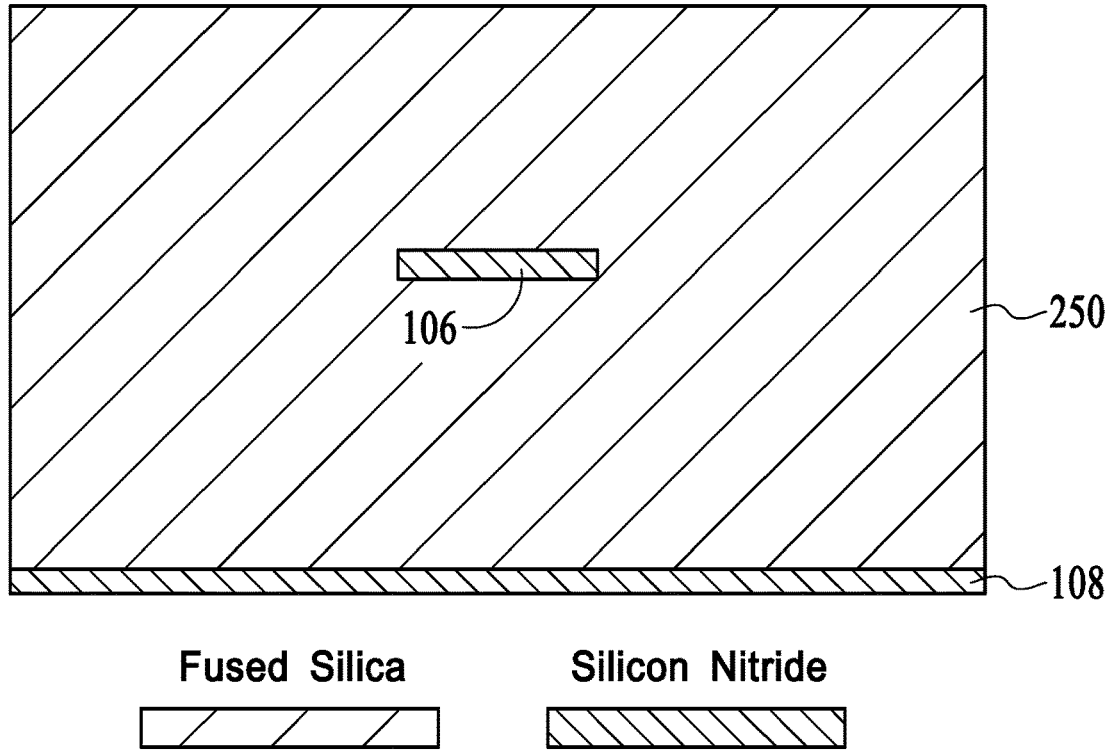
FIG. 17 is a schematic of a SiN waveguide core in an "all glass" (fused silica top and bottom cladding) configuration, according to an embodiment of the present disclosure.

FIG. 17 shows one example where the starting wafer (e.g., with a notch 122) and the bonded wafer are both fused silica so that we have an "all glass" configuration 250. Alternatively, a silicon substrate with a pre-grown oxide (as shown in FIG. 1) may be used as the starting wafer, and another such wafer (upside down with the pre-grown oxide layer facing the SiN waveguide core 106) is bonded from the top to create the top cladding.

Figure 18:
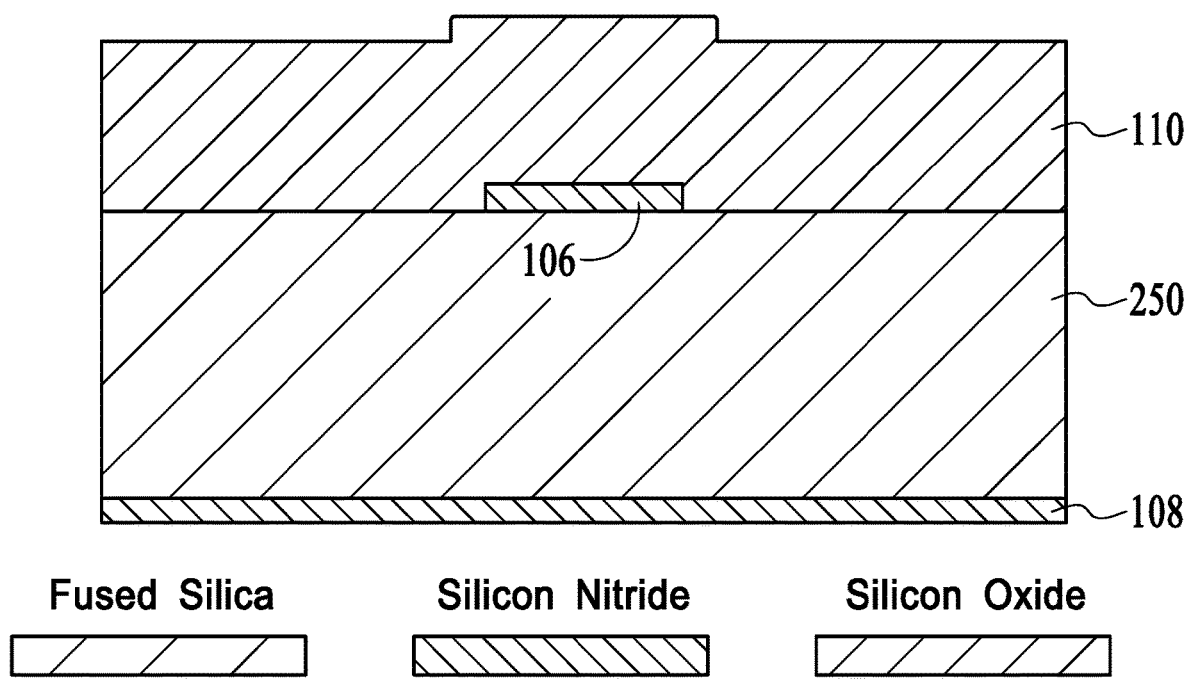
FIG. 18 is a schematic of a SiN waveguide core where the bottom cladding is fused silica and the top cladding is silicon oxide, according to an embodiment of the present disclosure.

FIG. 18 shows an alternative where the starting wafer is a fused silica wafer 250 on top of which a SiN waveguide core 106 is formed and the upper cladding is formed from TEOS (or other alternative sources, such as chlorinated sources, deuterated sources etc.). Anneal length may be 6-10 hours multiple times at 1200 C to drive out contaminants.

Figure 19:
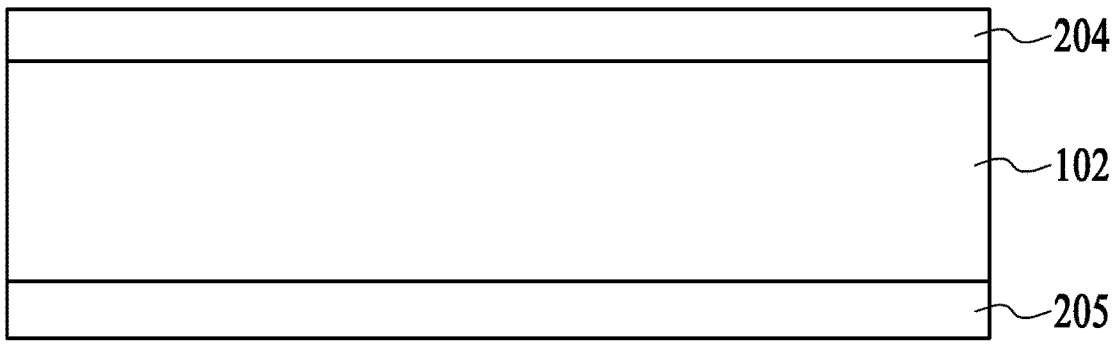
FIGS. 19-21 are schematics of a process flow that uses a thick oxide wafer as the starting material and then deposits and patterns a SiN waveguide core on top, according to an embodiment of the present disclosure.
Figure 20:
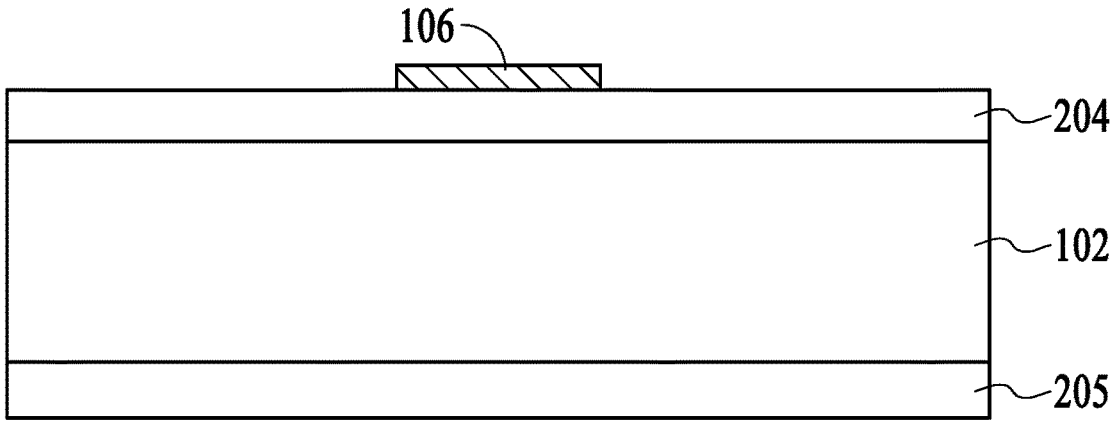
Figure 21:
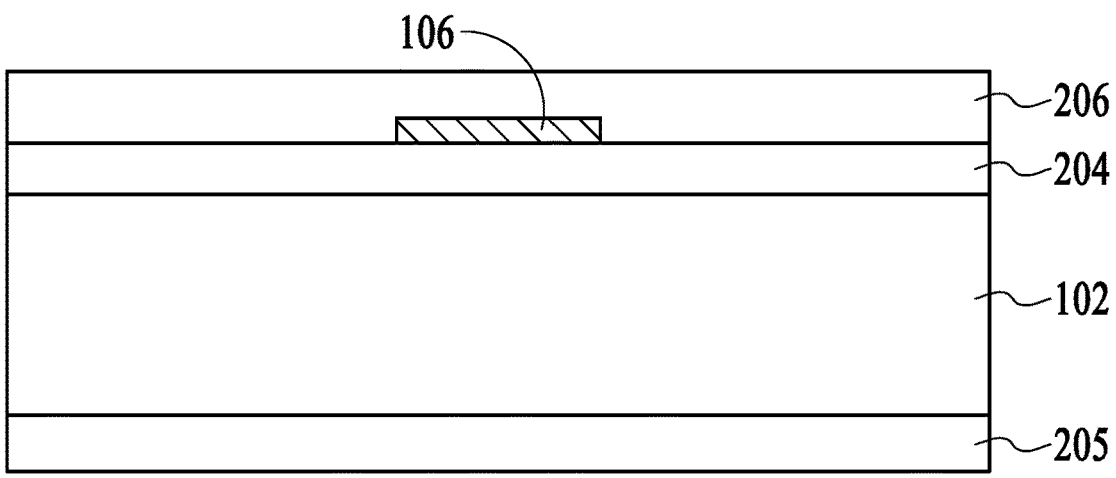

FIGS. 19-21 are schematics of a process flow that uses a thick oxide wafer as the starting material and then deposits and patterns a SiN waveguide core on top, according to an embodiment of the present disclosure. The thermally oxidized wafers may be 14.5 um thick and have thick oxide layers 204 and 205 on both sides of a substrate 204 as shown in FIG. 19. FIG. 20 shows that a SiN waveguide core 106 is deposited and patterned on top of the layer 204. FIG. 21 shows that an upper cladding 206 is formed to surround the waveguide core 106. The layer 206 may be deposited using TEOS oxide source as described above.

It is known that the sensitivity of an interferometric fiber-based optical gyro is determined by the phase different of two counter rotating beams and is represented by the following equation: $\Delta\phi=2\pi LD/\lambda c$, where L is the length of the fiber and D is the diameter of each loop. The same analogy applies to a planer device such as the SiPhOG where the fiber is replaced by a planer waveguide. To design a sensitive system, one would like to get the longer length and to maximize the product (L*D). However, a limitation to such a system is the propagation loss of the SiN waveguide. The present inventors have developed several methods to reduce the propagation loss such as the deposition-anneal sequence described above. From measurement data, it was determined that the reduction of loss is approaching the limit of the loss caused by the properties of the bulk material and the loss would largely depend on scattering caused by imperfections in the fabrication process. Since the waveguide cores are thin and wide (e.g., 60-100 nm thick and 2-3 um wide), the propagation loss has very low dependency on the roughness of the side walls of the waveguide core, and high dependency on the roughness of the bottom and top of the waveguide core. The waveguide-based gyroscope sensing coil with multiple turns can be tens of meters long, and it has been experimentally validated that the excess loss in the SiN chip can be attributed to scattering loss. In order to improve the scattering loss, the inventors have demonstrated that chemical mechanical polishing (CMP) can be used to reduce the roughness of the top and bottom surfaces of the waveguide core. The resulting levels of loss post-CMP is comparable to a new polished silicon wafer.

Figure 22:
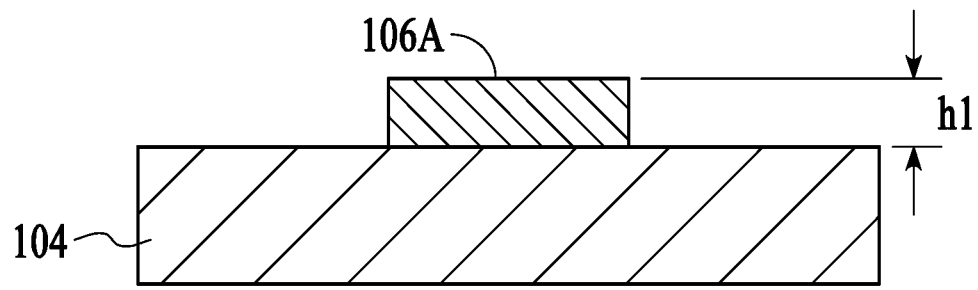
FIGS. 22-24 illustrate one possible CMP flow to create SiN waveguide core in an oxide bottom cladding layer, according to an embodiment of the present disclosure.
Figure 23:
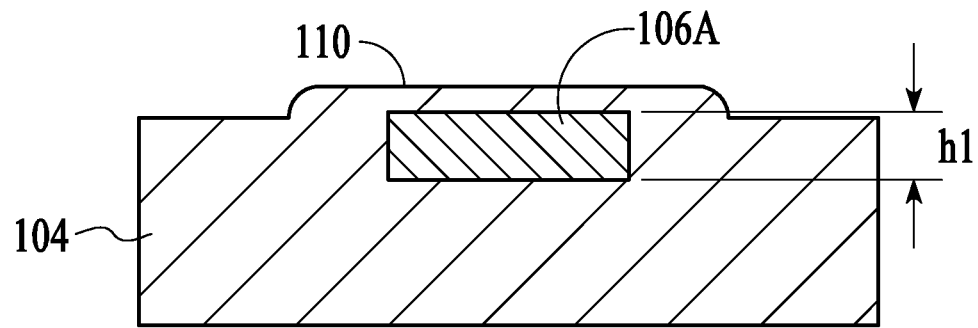
Figure 24:
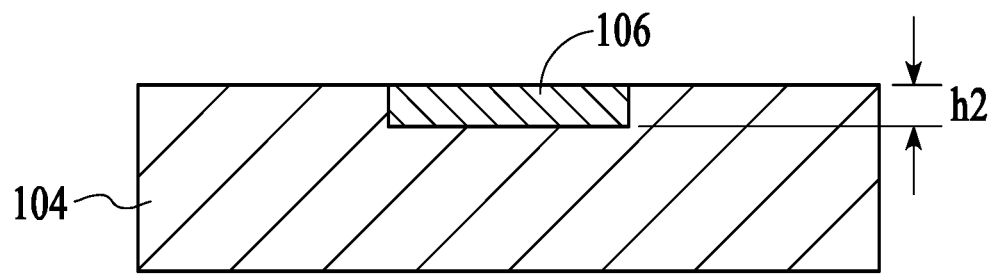

FIGS. 22-24 illustrate one possible CMP flow to create SiN waveguide core in an oxide bottom cladding layer, according to an embodiment of the present disclosure. In this process flow, a thicker layer of SiN is deposited and patterned (106A) on silicon dioxide bottom cladding layer 104, as shown in FIG. 22. The thickness 'h1' can be much higher (e.g., double the final desired thickness), i.e. precision thickness control of the SiN layer is not necessary in this step. Then, as shown in FIG. 23, a top oxide layer 110 is deposited encompassing the waveguide core 106A, which is still thicker than the final desired thickness 'h2'. Finally, the top oxide layer 110 and a portion of the SiN layer 106A is polished using a CMP process, so that the final thickness of the waveguide core 106 is the desired thickness 'h2', and the top surface of the waveguide core 106 is automatically flush with the top surface of the bottom cladding oxide layer 104, as shown in FIG. 24.

Figure 25:
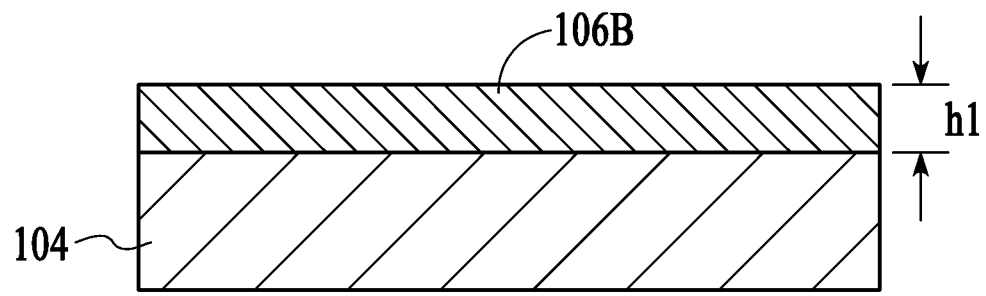
FIGS. 25-26 illustrate an alternative CMP flow to create SiN waveguide core, according to an embodiment of the present disclosure.
Figure 26:
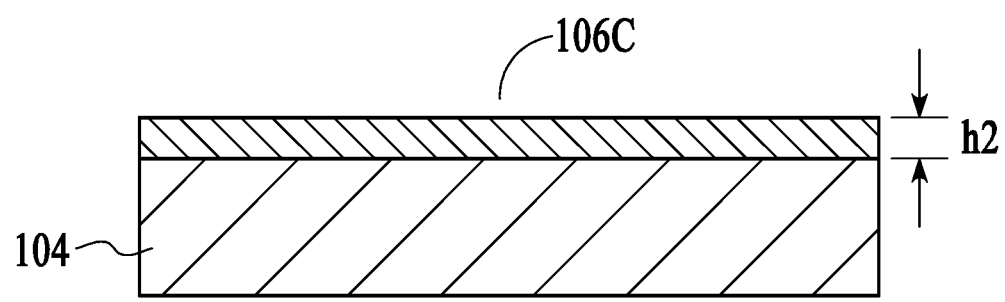

FIGS. 25-26 illustrate an alternative CMP flow to create SiN waveguide core, according to an embodiment of the present disclosure. In this process flow, a thicker layer 106B of SiN is deposited on silicon dioxide bottom cladding layer 104, as shown in FIG. 25. The thickness 'h1' can be much higher (e.g., double the final desired thickness), i.e. precision thickness control of the SiN layer is not necessary in this step. Then the SiN layer 106B can be polished using a CMP process to bring the thickness down to the desired thickness 'h2' (layer 106C). In an example, h1 can be in the range of 200 nm, while h2 can be in the range of 100 nm or lower. The thinned down layer 106C can then be patterned to create the waveguide core 106.

Figure 27:
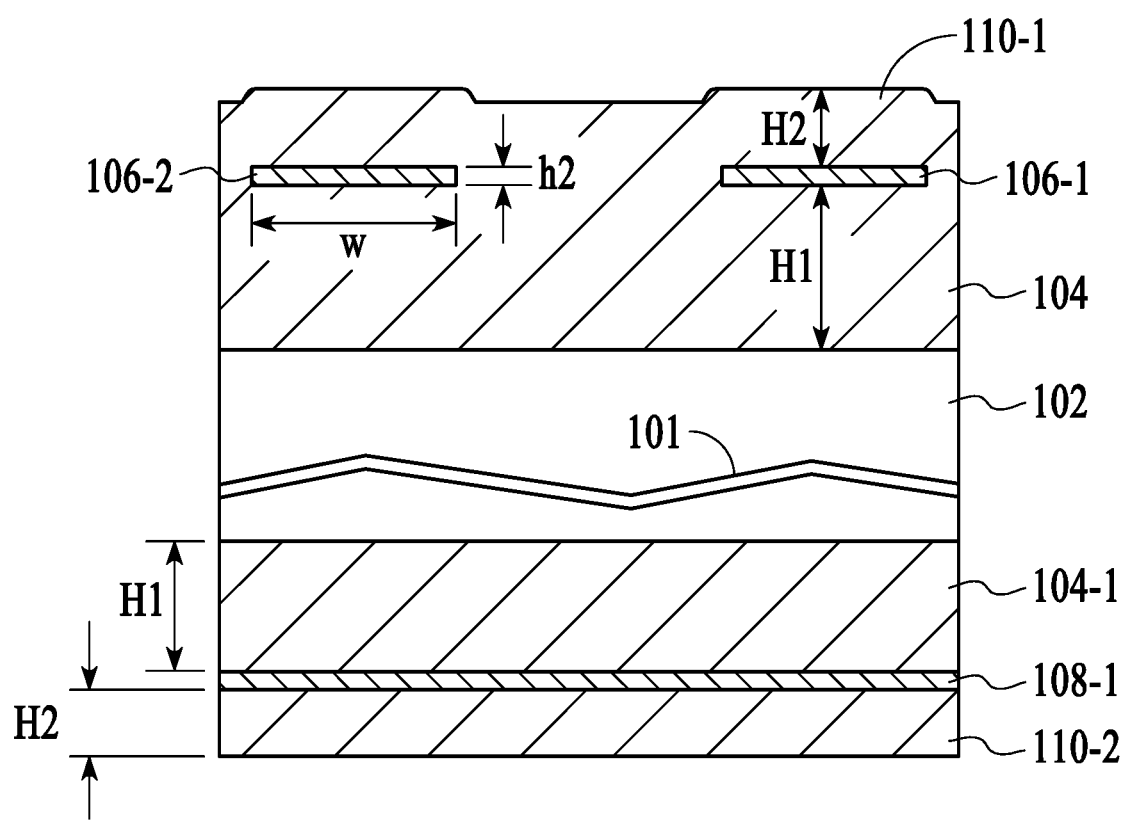
FIG. 27 illustrates a final cross section of a single-layer gyroscope sensing chip with the waveguide cores in one layer, according to an embodiment of the present disclosure.

FIG. 27 illustrates a final cross section of a single-layer gyroscope sensing chip with the waveguide cores in one layer, according to an embodiment of the present disclosure. Each of the waveguide cores 106-1 and 106-2 (with thickness h2 and width w) can be envisioned as adjacent turns of a multi-turn sensing coil of an optical gyroscope. The cores can be formed on the bottom cladding layer 104 using one of the CMP flows (or other fabrication flows) described above. Post-CMP, the top cladding layer 110-1 is deposited. Note that when the bottom cladding layer 104 (of thickness H1), SiN layer 106, and top cladding layer 110-1 (of thickness H2) are formed on one side of a silicon substrate 102, corresponding oxide layer 104-1 (of thickness H1), SiN layer 108-1, and oxide layer 110-2 are also formed on the other side on the substrate 102. The discontinuity 101 is shown in the middle of the silicon substrate 102 to convey the idea that the thickness of the silicon substrate 102 is orders of magnitude higher than the rest of the device layers.

Figure 28:
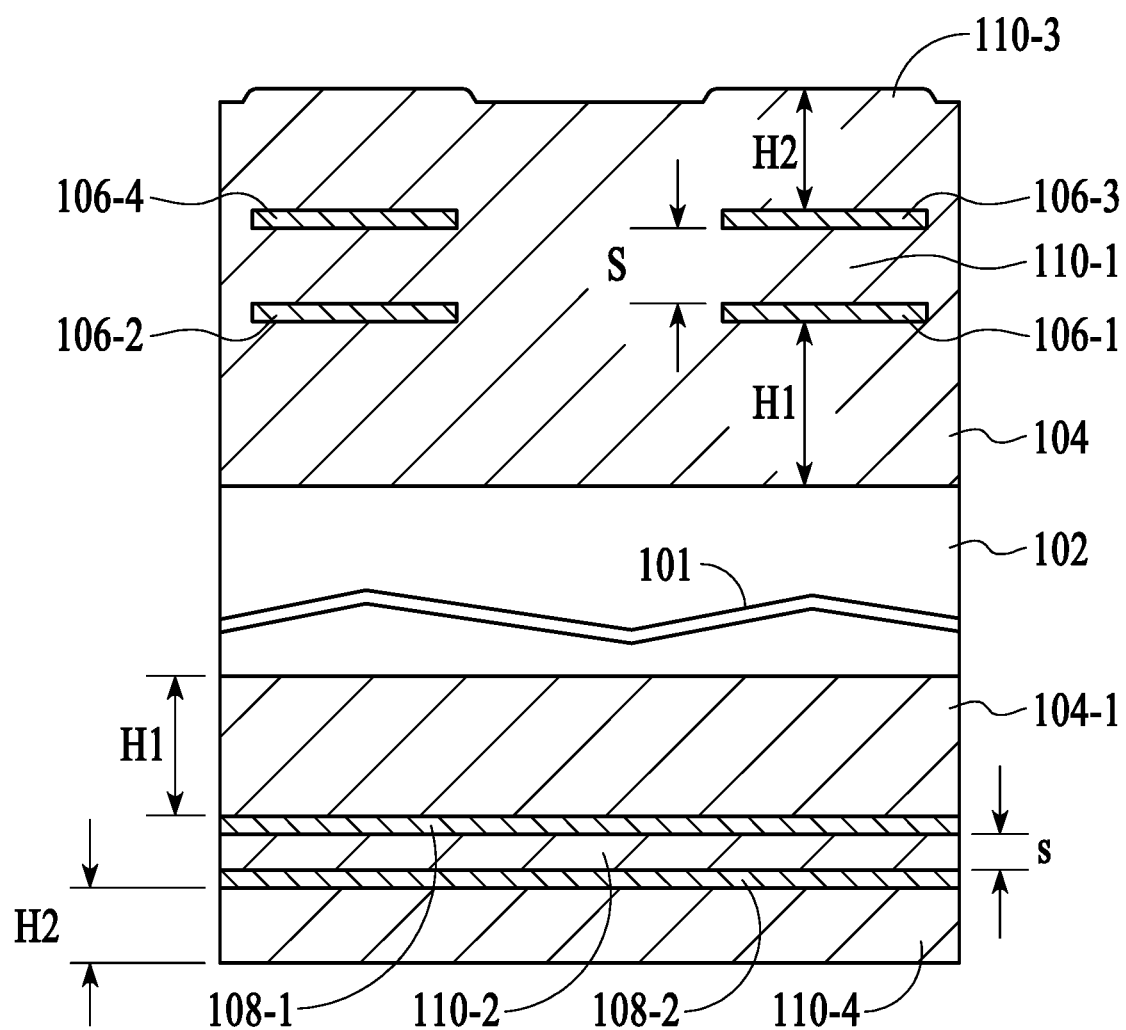
FIG. 28 illustrates a final cross section of a multi-layer gyroscope sensing chip with the waveguide cores in two layers, according to an embodiment of the present disclosure.

FIG. 28 illustrates a final cross section of a multi-layer gyroscope sensing chip with the waveguide cores in two layers, according to an embodiment of the present disclosure. Here, the deposition of oxide layers (110-1 and 110-3) and SiN layers (106-1, 106-2, 106-3, 106-4) and the CMP processes are repeated to create the final multi-layer structure. The first layer of waveguide cores 106-1 and 106-2 are vertically separated by the distance 'S' (thickness of oxide layer 110-1) from the second layer of waveguide cores 106-3 and 106-4. On the other side of the silicon substrate 102, corresponding oxide layers 104-1, 110-2, and 110-4 and SiN layers 108-1 and 108-2 are automatically formed, though those layers may not be used for waveguiding purposes.

Persons skilled in the art would appreciate that various metrology steps (including but not limited to wafer bow inspection at various stages, refractive index measurement at certain wavelengths of interest, line edge roughness measurement etc.) can be incorporated to monitor the efficacy of the process flow and to determine process parameter adjustments.

Additionally, persons skilled in the art will appreciate that different generations of SiPhOGs may be based on interferometric waveguide coils or ring resonators, but both configurations depend on low-loss waveguide cores and cladding structures as described in the figures in this disclosure.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. Additionally, the directional terms, e.g., "top", "bottom" etc. do not restrict the scope of the disclosure to any fixed orientation, but encompasses various permutations and combinations of orientations.

What is claimed is:

1. A method of fabricating integrated photonics optical gyroscopes, comprising:
    providing a silicon substrate with a first oxide layer thereon, wherein the first oxide layer acts as a lower cladding of a waveguide;
    forming a patterned silicon nitride (SiN) layer on top of the first oxide layer, the patterned SiN layer acting as a core of the waveguide;
    forming a second oxide layer on top of the patterned SiN layer, wherein the second oxide layer is formed by repeating the following sequence for a predetermined number of times:
    depositing a first sub-layer of the second oxide for a predetermined thickness;
    annealing the deposited first sub-layer of the second oxide at a predetermined temperature for a predetermined period of time to drive impurities out;
    depositing a subsequent sub-layer of the second oxide for the predetermined thickness; and
    after deposition of each subsequent sub-layer of the second oxide, annealing the deposited sub-layers at the predetermined temperature for the predetermined period of time to drive impurities out, wherein each sub-layer is 0.1-0.2 µm thick; and
    polishing the second oxide layer down to a reduced thickness by chemical mechanical polishing (CMP).

2. The method of claim 1, wherein a wafer is bonded on top of the second oxide layer polished down to the reduced thickness by CMP.

3. The method of claim 2, wherein the CMP causes to achieve a desired surface roughness for wafer bonding.

4. The method of claim 2, wherein the wafer bonded on top of the second oxide layer comprises a fused silica wafer.

5. The method of claim 2, wherein the wafer bonded on top of the second oxide layer acts as at least a part of an upper cladding of the waveguide.

6. The method of claim 1, wherein forming a patterned silicon nitride (SiN) layer on top of the first oxide layer comprises:
    depositing SiN layer for a first thickness that is higher than a desired thickness of the waveguide core;
    reducing the first thickness of the SiN layer by an additional CMP process to a second thickness, wherein the second thickness is the desired thickness of the waveguide core.

7. The method of claim 6, wherein the second oxide layer is deposited after the additional CMP process to obtain the desired thickness.

8. The method of claim 1, wherein the second oxide layer comprises oxide deposited using a precursor gas chosen from: TEOS, chlorinated source, or deuterated source.

9. The method of claim 8, wherein the impurities that are driven out from the second oxide layer comprises hydrogen.

10. The method of claim 1, wherein the predetermined temperature for annealing ranges from 1100-1300° C.

11. The method of claim 1, wherein the predetermined period of time for annealing depends on thickness of each sub-layer.

* * * * *